United States Patent
Mason

[15] 3,695,040
[45] Oct. 3, 1972

[54] AIRCRAFT POWER PLANT
[72] Inventor: Michael D. L. Mason, 5 Partridge Ave., Baguley Hall, Manchester 23, England
[22] Filed: March 17, 1970
[21] Appl. No.: 20,328

[52] U.S. Cl. ................................ 60/203, 310/10
[51] Int. Cl. ........ G21d 5/00, H05b 7/00, H05b 7/16, H05b 7/18
[58] Field of Search .......... 60/203, 39.72; 310/4, 10; 317/3

[56] References Cited

UNITED STATES PATENTS

| | | | |
|---|---|---|---|
| 3,013,384 | 12/1961 | Smith | 60/203 |
| 3,122,882 | 3/1964 | Schultz et al. | 310/10 |
| 2,008,246 | 7/1935 | Deutsch | 310/10 |
| 2,725,718 | 12/1955 | Sheets et al. | 60/39.72 X |
| 2,963,864 | 12/1960 | Gross | 60/39.72 X |
| 3,258,911 | 7/1966 | Bouquet et al. | 60/203 |
| 2,765,975 | 10/1956 | Lindenblad | 317/3 UX |
| 2,990,912 | 7/1961 | Cole | 310/10 |

Primary Examiner—Mark M. Newman
Assistant Examiner—R. B. Rothman
Attorney—Cushman, Darby & Cushman

[57] ABSTRACT

An aircraft power plant includes a nuclear reactor, a device for converting reactor heat to electricity which is used to create a silent discharge, an air-breathing engine, the ingested air being heated by being passed through said discharge, and a jet nozzle for expelling the heated air to obtain thrust.

8 Claims, 4 Drawing Figures

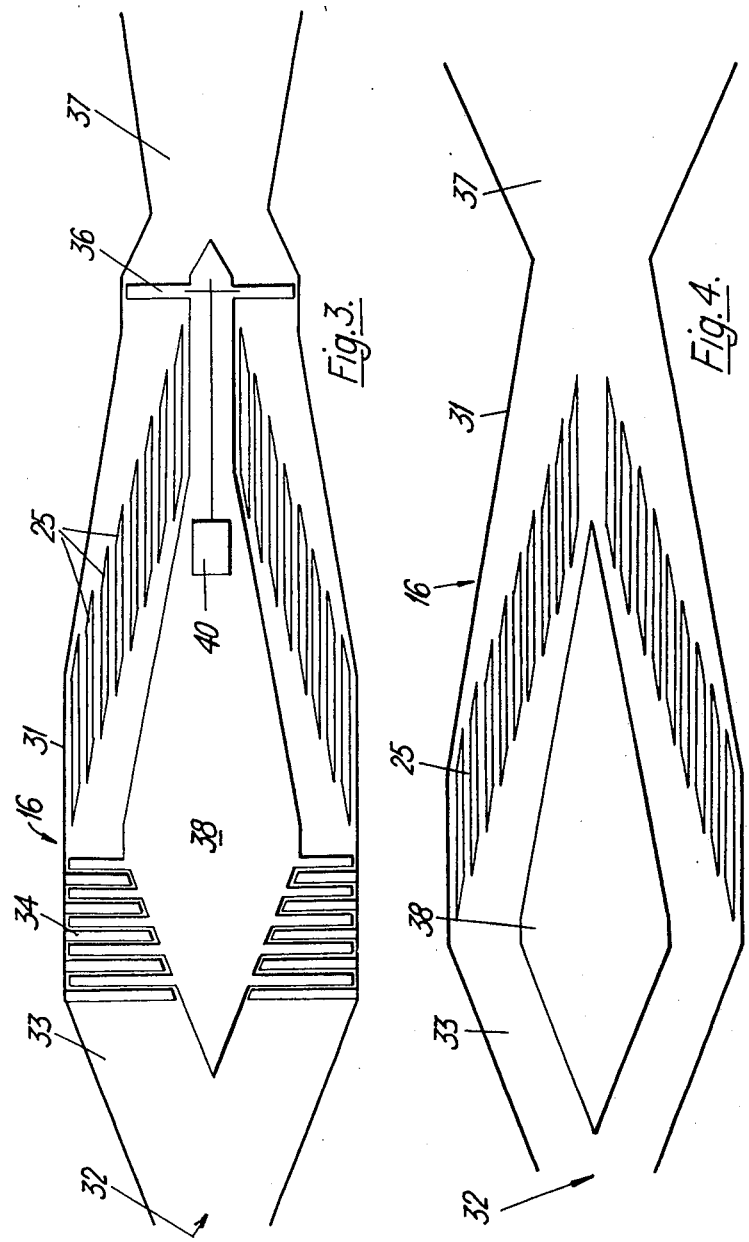

AIRCRAFT POWER PLANT

The present invention relates to an aircraft power plant which makes use of nuclear energy.

It is well-known that the jet-engined aircraft has only a limited performance as regards operational range, maximum speed and maximum altitude of operation.

The chief attraction of some sort of nuclear propulsion is the virtually unlimited range due to the usage of nuclear fuel, as opposed to chemical fuel. However, the problems of weight penalty, possible air pollution and heat transfer have made the development of aircraft nuclear propulsion very slow.

The present invention seeks to overcome these difficulties and problems, and to provide aircraft power plant wherein the fissile heat is converted into propulsive thrust in an improved manner.

According to the present invention, there is provided aircraft power plant including an air intake, jet nozzle means, ducting connecting the said intake and the said jet nozzle means, nuclear reactor means, and means to impart reactor heat-energy to an electron producing means which is so disposed in said ducting as to produce, in use, electrons for exciting, by collision, the molecules of the constituent elements of the air passing through said ducting, the excitation energy being released in the form of heat to produce a hot propulsive jet.

Preferably, the said means to impart reactor heat energy is a turbo-alternator system.

Said electron producing means may include a plurality of electrode plates arranged so as to produce a stream of electrons and energized by the electric output of said turbo-alternator system.

Advantageously, the said electrode plates are arranged to form a silent discharge source.

Preferably, each plate is made of a highly conducting metal coated with a very thin layer of insulating material of low work function and high secondary electron emissivity.

Optionally, the plurality of plates may be arranged in the form of a triangular wedge in said ducting, the wedge tapering in the direction of the jet nozzle means.

In one preferred arrangement, a compressor and a turbine drivingly interconnected therewith are mounted in flow series in said ducting, the electron producing means being disposed between the said compressor and turbine.

However, in an alternative arrangement, the compressor and the turbine are dispensed with, and the power plant operates on the ramjet principle.

Preferred embodiments of the invention will now be described, merely by way of example, with reference to the accompanying drawings, where:

FIG. 3 is a schematic section of an air-breathing turbo-jet engine forming part of the invention; and FIG. 4 is an alternative to FIG. 3, showing a ramjet engine.

Figure 1:
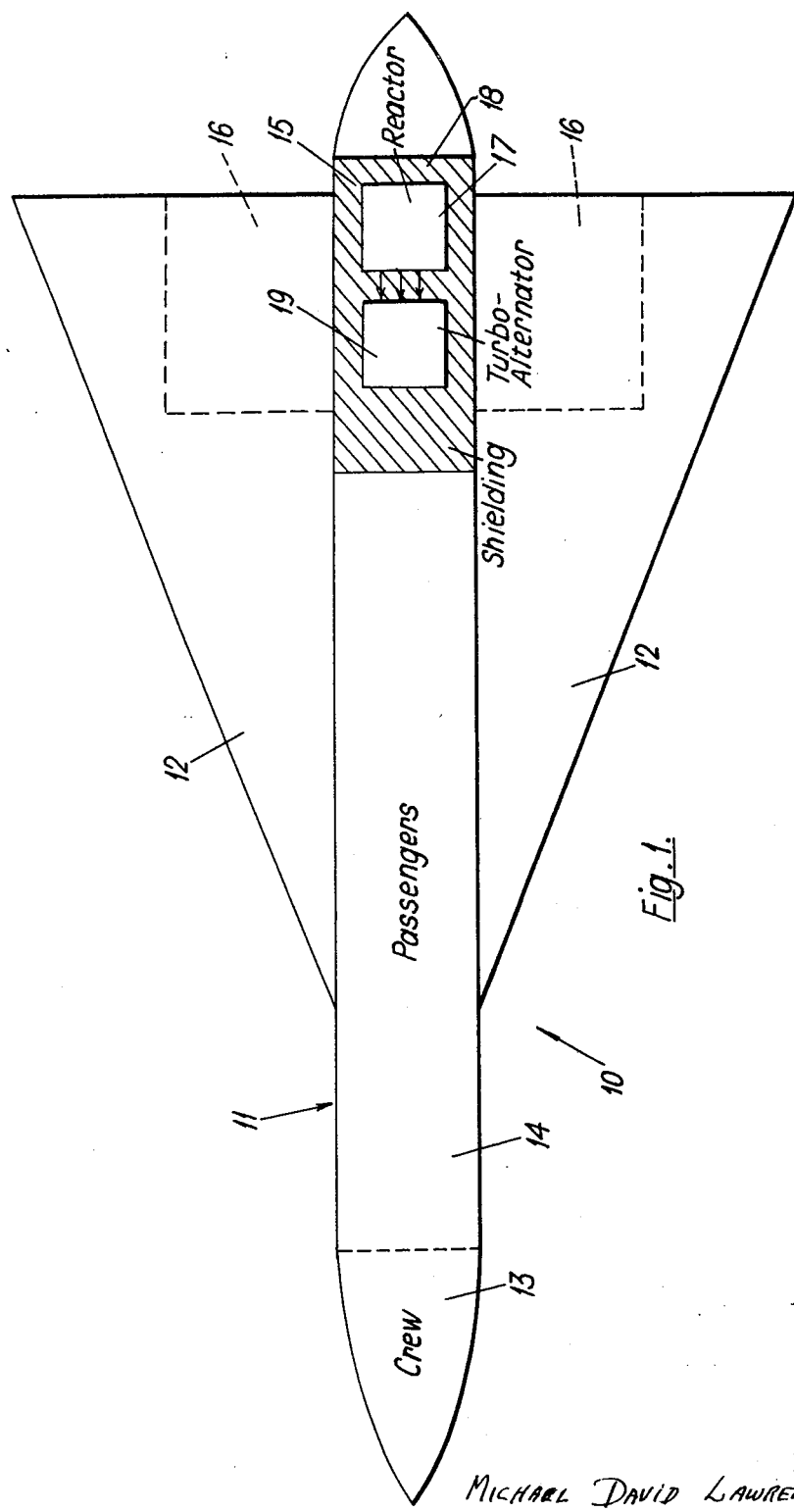
FIG. 1 is a schematic plan view of an aircraft provided with a power plant according to this invention.
Figure 2:
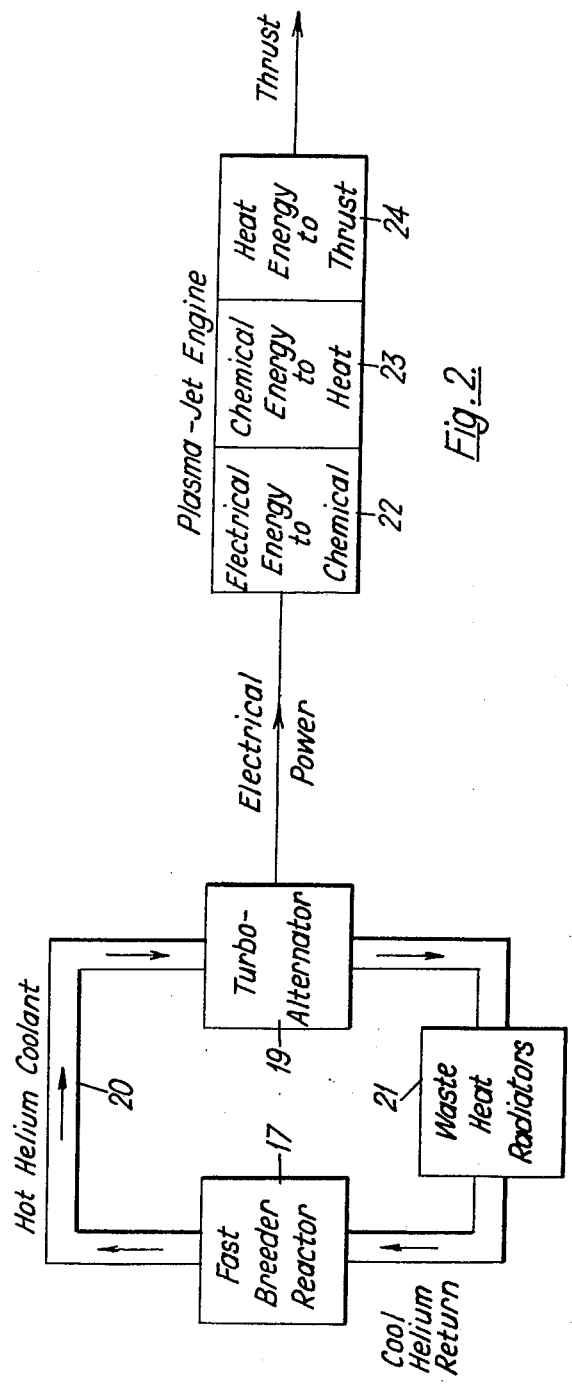
FIG. 2 is a schematic block diagram of the said power plant.

Referring to the drawings, the principle of the present invention will first be described with reference to FIGS. 1 and 2.

An aircraft 10 has a fuselage 11 and delta-shaped wings 12. The fuselage is divided into a crew compartment 13, a passenger or payload compartment 14 and a power plant housing 15.

Each wing 12 carries a plasma-jet engine 16 on its underneath side, the engines 16 being shown in more detail in FIGS. 3 and 4, and described below.

The power plant housing 15 has a nuclear reactor 17 mounted therein, which is surrounded by suitable shielding 18 to protect the passengers and crew and to prevent air pollution generally.

The reactor 17 is coupled with a turbo-alternator system 19. The reactor 17 is a fast breeder reactor through which high pressure helium coolant circulates in operation, the coolant ducting being shown at 20 in FIG. 2, with the direction of coolant flow being indicated by arrows. The cool helium is heated by passing through the core of the reactor 17 and is passed into a large Rankine-cycle helium turbine forming part of the turbo-alternator 19. The turbine then drives one or more alternators to generate electricity. The helium compressors are now shown.

As is known, in the Rankine-cycle residual heat has to be disposed of after the helium gas has been expanded in the turbine. Some of this heat can be used for de-icing of all wing and nose leading edges, and the remainder will be chiefly wasted by radiation from the wings 12. This is simply shown by the block 21 in FIG. 2, labelled as "waste heat radiators."

The electrical output of the turbo-alternator 19 is passed to a converter 22 for converting electrical energy into chemical energy. The converter 22 is in principle similar to an ozonizer wherein air is bombarded by high-speed electrons obtained from a "silent discharge" (i.e., not a corona or arc discharge) to excite the molecules of oxygen and nitrogen, and to produce ozone. In contrast to the ozonizer, however, in this invention it is intended that the excited molecules give up their excitation energy-obtained by electron collisions - in the form of heat to the air which is then expanded to form a propulsive jet. These processes are indicated by blocks 23 and 24 in FIG. 2.

The converter 22 basically consists of a very large number of parallel electrode plates 25 connected together so as to form a series of cathodes and anodes across which the electrical output of the turbo-alternator 19 is applied. Thus, the converter 22 is really an electron-producing means.

As can be seen in FIG. 3, the air-breathing engine 16 has an outer casing 31 in which are provided, in flow series, an air intake 32, a diffuser 33, a multi-stage axial-flow compressor 34, the plates 25, a turbine 36, and a jet nozzle 37. The turbine 36 is drivingly interconnected with the compressor 34 by means of shafting (not shown) located within a center body 38. The plates 25 are arranged in a substantially wedge-shaped manner, with the apex of the wedge being at the downstream end thereof.

Thus, in operation, air ingested at 32 and compressed at 34 will pass through and between the plates 25 to be bombarded by electrons leaving the cathode plates and accelerated by the electric field applied across the plates 25.

The mechanism of electron emission is not of primary importance and it is thought that in the main secondary electrons will be emitted due to incident primary electrons and positive ions. For this, the best solution is to make the plates 25 of a highly conducting metal, such as Cu or W, coated with a very thin layer of insulator having a low work function and high ratio of secondary electrons emitted per incident primary electrons. A suitable insulator may be Pyrex glass. The preferred discharge is a silent (i.e., not arc or corona) discharge to prevent the plates 25 from becoming overheated.

When an electron collides with a molecule, almost all of its kinetic energy is given to the molecule. If the mean free path of the electron is sufficiently long, the energy it can transfer in the collision will be sufficient to change the molecules into atoms and ions as well as into excited molecules, atoms and ions. It is believed that the electrons emitted directly from the surface of the plates 25 will be the most effective for this process. For propulsion, the energy thus given to the air flow can be released as heat by the decomposition or reconversion of the atoms, ions and excited molecules, atoms and ions back to the original molecules, in the presence of a suitable catalyst, if so required. The release of heat will expand the air flowing through the engine 16 to obtain jet thrust.

Owing to the air flow, the resultant direction of motion of the electrons has a downstream component, hence the wedge-shaped plate arrangement in which, however, there is always part of an anode plate downstream of the downstream-most cathode plate.

In the arrangement of FIG. 3, an electric motor 40 is disposed in the center body 38 to assist the turbine 36 in starting and driving the compressor 34. The motor 40 is a large induction motor with a high synchronous speed. At high altitudes, it may be possible to arrange that the motor 40 alone drives the compressor 34 and the turbine 36 freewheels.

In FIG. 4 the engine 16 is a ramjet engine with the plates 25 taking the place of the usual combustion chamber.

The exact shape and size of the plates 25 will depend on intended use (i.e., subsonic transport, supersonic or hypersonic flying) and so will also the plate mounting structure.

However, it is contemplated as an example that the plates will be several feet long, about 0.04 inch thick and the plate separation is also about 0.04 inch. The mounting structure would include transverse, aerodynamically faired struts or rods, preferably of the same material as the plates to reduce any tendency of the plate separation to change with temperature.

As shown in FIGS. 3 and 4, the plates have a small angle (of the order of 5°) taper on their leading and trailing edges to reduce drag and to assist in the design of a "constant area combustion chamber."

I claim:

1. Aircraft power plant including:
    an air intake,
    jet nozzle means,
    ducting connecting the said intake and the said jet nozzle means,
    nuclear reactor means,
    silent discharge electron beam producing means for producing a silent discharge beam of moving electrons and
    means to impart reactor heat energy from said reactor means to said silent discharge electron beam producing means which is disposed in said ducting to produce, in use, electrons for exciting by collision the molecules of the constituent elements of air passing through said ducting, the excitation energy being released in the form of heat to produce a hot propulsive jet.

2. Aircraft power plant as in claim 1 wherein the said means to impart reactor heat energy comprises a turbo-alternator system.

3. Aircraft power plant as in claim 2 wherein said silent discharge electron beam producing means includes a plurality of electrode plates arranged to produce a stream of electrons and connected for energization by the electrical output of said turbo-alternator system.

4. Aircraft power plant as in claim 3 wherein the said electrode plates are arranged to form a continuous silent discharge electron source.

5. Aircraft power plant as in claim 3 wherein the plurality of electrode plates are generally arranged in the form of a triangular wedge in said ducting, the wedge tapering in the direction of the jet nozzle means.

6. Aircraft power plant as in claim 1 wherein each of said electrode plates comprises a highly conducting metal coated with a very thin layer of insulating material, said insulating material having a low work function and a high secondary electron emissivity.

7. Aircraft power plant as in claim 1 wherein a compressor and a turbine drivingly interconnected therewith are mounted in flow series in said ducting, the electron producing means being disposed between the said compressor and turbine.

8. A method for obtaining jet thrust in a jet engine including an air intake and jet nozzle means with ducting connected therebetween, said method comprising the steps of:
    reacting radioactive materials in a nuclear reactor means to obtain heat energy,
    transforming at least part of said heat energy into electrical energy
    using at least part of said electrical energy to obtain a silent discharge of electrons within said ducting, and
    passing air through said ducting whereby molecules of the constituent elements of the air are excited by collision with said electrons, the excitation energy being released in the form of heat to produce a hot propulsive jet.

* * * * *